No. 792,736. PATENTED JUNE 20, 1905.
J. SJASTRAM.
POT OR PAN LIFTER.
APPLICATION FILED OCT. 10, 1904.
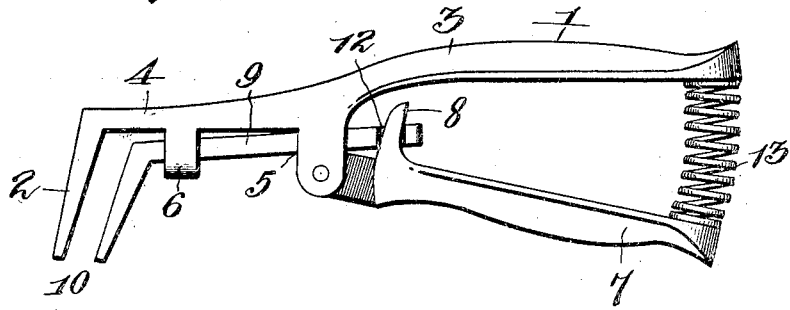
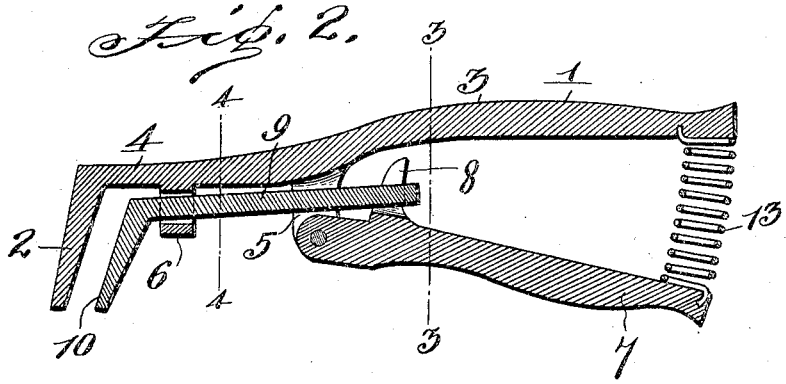
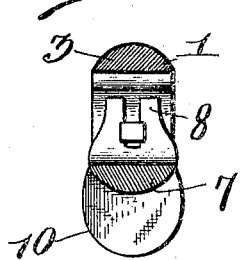
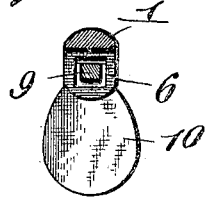
Witnesses
Jas. A. Koehl.
C. H. Griesbauer.
Inventor
Johan Sjastram.
by H. B. Willson
Attorney No. 792,736. Patented June 20, 1905.

UNITED STATES PATENT OFFICE.

JOHAN SJASTRAM, OF CRIPPLECREEK, COLORADO.

POT OR PAN LIFTER.

SPECIFICATION forming part of Letters Patent No. 792,736, dated June 20, 1905.

Application filed October 10, 1904. Serial No. 227,921.

*To all whom it may concern:*

Be it known that I, JOHAN SJASTRAM, a citizen of the United States, residing at Cripplecreek, in the county of El Paso and State of Colorado, have invented certain new and useful Improvements in Pot or Pan Lifters; and I do declare the following to be a full, clear, and exact description of the invention, such as will enable others skilled in the art to which it appertains to make and use the same.

This invention relates to improvements in lifters for pots or pans.

The object of the invention is to provide a device of this character by the use of which hot pans, pots, or the like may be removed from the stove or oven without danger of burning the hands.

A further object is to provide a device of this character which will be simple, strong and durable in construction, inexpensive, and so formed as to afford a firm grip, thereby enabling the same to lift heavy pots or pans.

With these and other objects in view the invention consists of certain novel features of construction, combination, and arrangement of parts, as will be hereinafter more fully described, and particularly pointed out in the appended claim.

In the accompanying drawings, Figure 1 is a side elevation of the invention. Fig. 2 is a longitudinal vertical sectional view of the same. Fig. 3 is a cross-sectional view on the line 3 3 of Fig. 1, and Fig. 4 is a similar view on the line 4 4 of Fig. 1.

In the embodiment of the invention I provide a stationary handle 1, on the tapered outer end of which is formed a fixed jaw-plate 2. The handle 1 is preferably formed of a curved hand-engaging portion 3 and an outer jaw-carrying portion 4, said outer jaw-carrying portion having a flat inner surface on which adjacent to the portion 3 is formed laterally-projecting parallel apertured lugs 5. Midway between said lugs and the jaw-plate 2 is formed a laterally-projecting apertured guide-lug 6. Between the outer ends of the lugs 5 is pivoted the reduced outer end of a movable handle 7, said handle being curved and shaped similar to the hand-engaging portion 3 of the stationary handle 1. On the inner side of the movable handle 7, adjacent to the reduced pivoted end of the same, is formed an inwardly-projecting forked lug 8.

Slidably mounted in the apertured guide-lug 6 and between the inner portion of the lugs 5 is a rectangularly-shaped movable jaw stem or bar 9, on the outer end of which is arranged a movable jaw-plate 10. Said plate is adapted to coact with the jaw-plate 2 to form a gripping device. The inner end of the stem or bar 9 is recessed on each side, as shown at 12, and with said recessed portions is adapted to be engaged the forked lug 8 of the movable handle, whereby when said handle is moved inwardly or outwardly with respect to the stationary handle 1 said stem or bar will be projected or retracted toward or from the outer end of the stationary jaw, thus engaging or disengaging the movable jaw-plate 10 with or from the stationary jaw-plate 2, by which means the side or rim of a pot or pan may be grasped, thereby forming a handle by which said pot or pan may be lifted and moved. Between the inner ends of the handles 1 and 7 is arranged a coil-spring 13, whereby said movable handle is forced away from said stationary handle, thereby causing the forked lug 8 to normally retract the stem or bar 9 and the movable jaw-plate 10 from engagement with the fixed jaw-plate 2.

A lifting device as herein shown and described will be capable of securing a very tight grip upon the pot or pan, thereby enabling the same to lift heavy pots or pans containing heavy substances.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A lifter for pots and pans, comprising a handle formed at one end with a fixed jawblade and provided on its under side with a guide-lug and a pair of pivot-lugs, a handle pivoted between said pair of pivot-lugs and having lugs on its inner side, a spring between the fixed jaw and pivoted handle and normally moving the latter outwardly, and a longitudinally-movable bar mounted for longitudinal movement in the guide-lug, having its inner end notched on opposite sides, said notched portion of the bar being between and slidably connected to the lugs of the pivoted handle and having a jaw at its outer end to coact with the jaw of the fixed handle, substantially as described.

In testimony whereof I have hereunto set my hand in presence of two subscribing witnesses.

JOHAN SJASTRAM.

Witnesses:
GUST MILLER,
WILLIAM JOHNSON.